(12) United States Patent
Wang et al.

(10) Patent No.: US 12,407,243 B2
(45) Date of Patent: Sep. 2, 2025

(54) LEAKAGE CURRENT SUPPRESSION METHOD FOR STRING PHOTOVOLTAIC SYSTEM

(71) Applicant: GINLONG TECHNOLOGIES CO., LTD., Ningbo (CN)

(72) Inventors: Yiming Wang, Ningbo (CN); Wenping Zhang, Ningbo (CN); Po Xu, Ningbo (CN); Wanshuang Lin, Ningbo (CN)

(73) Assignee: GINLONG TECHNOLOGIES CO., LTD., Ningbo (CN)

(*) Notice: Subject to any disclaimer, the term of this patent is extended or adjusted under 35 U.S.C. 154(b) by 0 days.

(21) Appl. No.: 18/691,110

(22) PCT Filed: Aug. 24, 2023

(86) PCT No.: PCT/CN2023/114697
§ 371 (c)(1),
(2) Date: Mar. 12, 2024

(87) PCT Pub. No.: WO2024/066831
PCT Pub. Date: Apr. 4, 2024

(65) Prior Publication Data
US 2025/0219526 A1    Jul. 3, 2025

(30) Foreign Application Priority Data
Sep. 26, 2022 (CN) .......................... 202211175562.0

(51) Int. Cl.
*H02M 1/088* (2006.01)
*H02J 3/38* (2006.01)
(Continued)

(52) U.S. Cl.
CPC ............. *H02M 1/088* (2013.01); *H02J 3/381* (2013.01); *H02J 3/44* (2013.01); *H02M 1/0038* (2021.05); *H02M 7/493* (2013.01); *H02J 2300/24* (2020.01)

(58) Field of Classification Search
CPC ...... H02M 1/088; H02M 1/00; H02M 1/0038; H02M 7/493; H02J 3/38; H02J 3/381; H02J 3/44; H02J 2300/24
See application file for complete search history.

(56) References Cited

U.S. PATENT DOCUMENTS

2003/0048136 A1    3/2003  Palaskas et al.

FOREIGN PATENT DOCUMENTS

| CN | 102780410 A | 11/2012 |
|----|-------------|---------|
| CN | 113285583 A | 8/2021  |

(Continued)

OTHER PUBLICATIONS

ISR of PCT/CN2023/114697.
CNIPA, Notification to grant patent right for Chinese application CN202211175562.0, May 9, 2023.

*Primary Examiner* — Robert L Deberadinis
(74) *Attorney, Agent, or Firm* — Hemisphere Law, PLLC; Zhigang Ma

(57) ABSTRACT

The present disclosure provides a leakage current suppression method for a string photovoltaic system. The leakage current suppression method includes the following steps: S100, inputting synchronous carriers to a plurality of parallel inverters included in the photovoltaic system; S200, carrying out carrier modulation on the inverters; and S300, controlling the switching state of each inverter according to the result of carrier modulation, and then dislocating common-mode components output by each inverter, so that part of the common-mode components of each inverter are canceled out, and the potential variation of the common- (Continued)

mode components output by the photovoltaic system is reduced. The method has the beneficial effects that the leakage current suppression method in the present disclosure is pure in software optimization, low in cost and simple in implementation method. The potential variation of the common-mode components output by the photovoltaic system is reduced by optimizing the switching state action sequence of each inverter, so that the suppression for leakage current is realized.

12 Claims, 14 Drawing Sheets

(51) Int. Cl.
*H02J 3/44* (2006.01)
*H02M 1/00* (2006.01)
*H02M 7/493* (2007.01)

(56) References Cited

FOREIGN PATENT DOCUMENTS

| | | | |
|---|---|---|---|
| CN | 113765346 | A | 12/2021 |
| CN | 114531052 | A | 5/2022 |
| CN | 115498910 | | 12/2022 |

LEAKAGE CURRENT SUPPRESSION METHOD FOR STRING PHOTOVOLTAIC SYSTEM

TECHNICAL FIELD

The present disclosure relates to the technical field of photovoltaic power generation, in particular to a leakage current suppression method for a string photovoltaic system.

BACKGROUND

The string photovoltaic system adopts modular design, and has the advantages of realizing multi-channel maximum power point tracking (MPPT) and effectively giving consideration to the difference between modules and preventing shadow occlusion and hot spot effect, so the string photovoltaic system is widely used.

In the photovoltaic system, non-isolated inverters are widely used because of the advantages in the aspects of efficiency, volume and cost. However, due to the large parasitic capacitance of photovoltaic panels to the ground, the common-mode component of the system can be circulated through a ground loop and parasitic capacitance of the photovoltaic panels to form leakage current. In the non-isolated inverter, the leakage current becomes more and more obvious because of no transformer isolation. If leakage current enters the power grid, the leakage current affects equipment in the power grid. At the same time, the shell of the photovoltaic panel is charged, resulting in a threat to personal safety.

There are many methods to suppress leakage current. The common method is to increase the impedance of the common-mode loop. For example, a common-mode choke coil is added. The method is relatively expensive. Or, additional branch circuits are connected in sequence to shunt the leakage current. For example, shunt branch circuits are connected in parallel to the middle point of the bus capacitor. According to the method, the leakage current enters the middle point of the bus capacitor, resulting in an impact on the normal operation of the system.

Therefore, there is an urgent need for a method capable of achieving a good suppression effect on leakage current of a string photovoltaic system.

SUMMARY

One of the purposes of the present disclosure is to provide a method capable of achieving a good suppression effect on leakage current of a string photovoltaic system.

In order to achieve the above purpose, through the technical scheme adopted in the present disclosure, a leakage current suppression method string photovoltaic system includes the following steps:

S100, inputting synchronous carriers to a plurality of parallel inverters included in the photovoltaic system;

S200, carrying out carrier modulation on the inverters;

S300, controlling the switching states of each inverter according to the result of carrier modulation, and then dislocating common-mode components output by each inverter, so that part of the common-mode components of each inverter are canceled out, the potential variation of the common-mode components output by the photovoltaic system is reduced, and then the leakage current can be suppressed.

Preferably, in step S200, the carrier modulation is space vector modulation, and the specific modulation process includes the following steps:

210, numbering the inverters #1, . . . , #n in sequence;

S220, carrying out space vectorization on the output voltage of the inverter to obtain a synthesized vector of the output voltage of any inverter and corresponding vector action time;

S230, allocating a starting small vector of the inverter #1, and taking a corresponding redundant small vector as a starting small vector of the next inverter until the redundant small vector corresponding to the inverter #n−1 is the starting small vector of the inverter #n; and S240, respectively forming the switching state action sequence of each inverter according to the allocated starting small vector.

Preferably, in step S220, the action time of the vector is calculated by judging that the resultant vector is located in the region of a space vector diagram.

Preferably, the space vector diagram includes six uniformly distributed sectors, and each sector is divided into four regions; and the resultant vector is suitable when the resultant vector falls into any area of any sector.

Preferably, the four regions of the sector are all triangular; and a seven-stage principle of space vector modulation is adopted in step S230.

Preferably, in step S100, the carriers transmitted to the inverters are used for synchronization through a control module.

Preferably, the control module includes a controller, and the controller is electrically connected with the inverters, so that triangular carriers are transmitted to the inverters through the controller, and then carrier synchronization of the inverters is realized.

Preferably, the control module includes a plurality of controllers, and the controllers are electrically connected with the corresponding inverters; and the carriers are synchronously transmitted to the controllers and then transmitted to the corresponding inverters through the controllers.

Preferably, the photovoltaic system needs carrier correction after the inverters operate for N switching periods, and the specific correction process includes the following steps:

S110, selecting any one of the inverters as a host machine and the rest of the inverters as slave machines;

S120, after every N switching periods, transmitting a synchronizing signal to the rest of the controllers by the controller connected with the host machine;

S130, after the synchronizing signal is received, comparing the phase difference between the zero point of the triangular carriers and the synchronizing signal by the controller connected with the slave machines; and S140, carrying out closed-loop regulation according to the phase difference by the controller connected with the slave machines so as to synchronize the carriers of the host machine and the slave machines.

Preferably, in step S120, the value of N is 2000.

Compared the prior art, the present disclosure has the following beneficial effects.

Firstly, the common-mode components of the inverters are staggered by optimizing the switching state action sequence of the inverters, so that part of the common-mode components of each inverter are canceled out, the potential variation of the common-mode components output by the photovoltaic system is ensured to be small, and then the leakage current can be suppressed.

Secondly, the leakage current suppression method in the present disclosure is pure in software optimization, low in cost and simple in implementation method.

Reference signs: 110, photovoltaic panel group; 120, converter; 130, inverter; and 200, controller.

DETAILED DESCRIPTION OF THE EMBODIMENTS

In the following, the present disclosure is further described with the attached figures and specific embodiments. It should be noted that the following embodiments or technical features can be arbitrarily combined to form a new embodiment without conflict.

In the description of the present disclosure, it needs to be illustrated that for location words, the indicative direction or position relations of the terms such as "center", "transverse", "longitudinal", "length", "width", "thickness", "upper", "lower", "front", "rear", "left", "right", "vertical", "horizontal", "top", "bottom", "inside", "outside", "clockwise" and "anti-clockwise" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

It needs to be noted that in the specification and claims of the present disclosure, the terms such as "first" and "second" are intended to distinguish between similar objects but do not necessarily indicate a specific order or sequence.

In one preferred embodiment of the present disclosure, as shown in FIG. 1 to FIG. 14, a leakage current suppression method for a string photovoltaic system includes the following steps:

S100, inputting synchronous carriers to a plurality of parallel inverters 130 included in the photovoltaic system;

S200, carrying out carrier modulation on the inverters 130; and

S300, controlling the switching states of each inverter 130 according to the result of carrier modulation, and then dislocating common-mode components output by each inverter 130, so that part of the common-mode components of each inverter 130 are canceled out, the potential variation of the common-mode components output by the photovoltaic system is reduced, and then the leakage current can be suppressed.

It should be known that the calculation formula of leakage current I is I=KUC; wherein, k is a leakage current constant; C is the parasitic capacitance of the photovoltaic system; and U is the voltage across a parasitic capacitance. In the embodiment, the value of the leakage current constant k is substantially constant. When the photovoltaic system operates, the value of the parasitic capacitance C generated by a photovoltaic panel group 110 and the ground can also be considered constant per unit time. Therefore, the leakage current I can be suppressed only by reducing the voltage U across the parasitic capacitor. That is, in the embodiment, the potential variation of the common-mode components output by the photovoltaic system is reduced.

Figure 1:
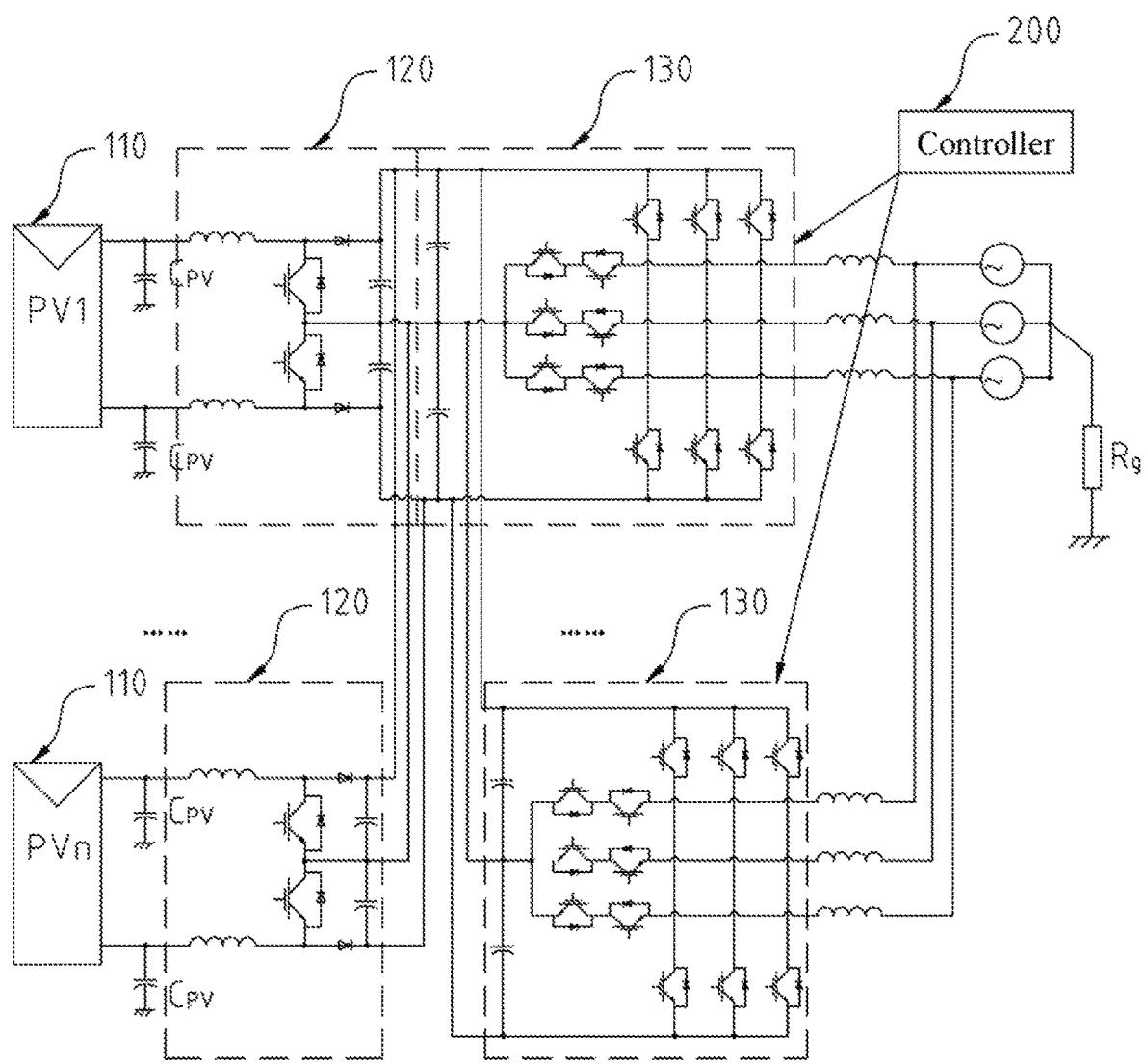
FIG. 1 is a schematic diagram of a circuit in the first embodiment of the present disclosure.
Figure 2:
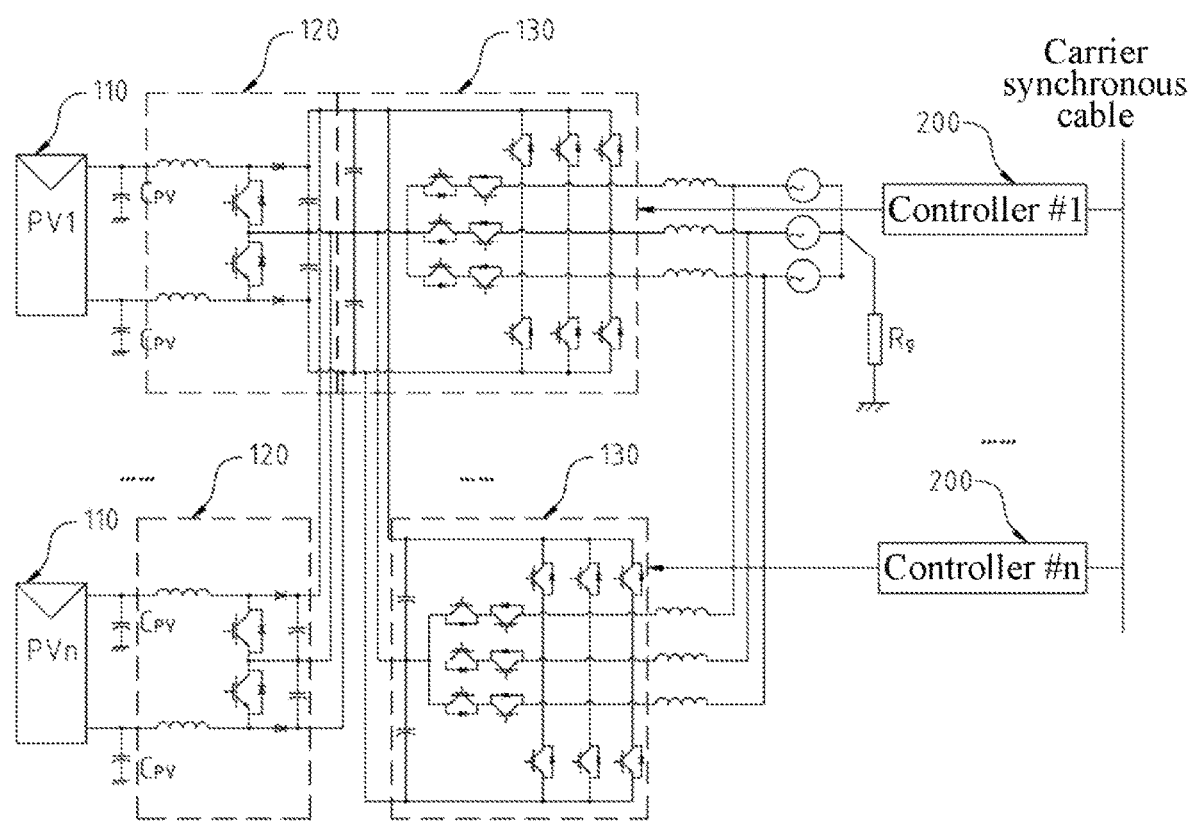
FIG. 2 is a schematic diagram of a circuit in the second embodiment of the present disclosure.
Figure 3:
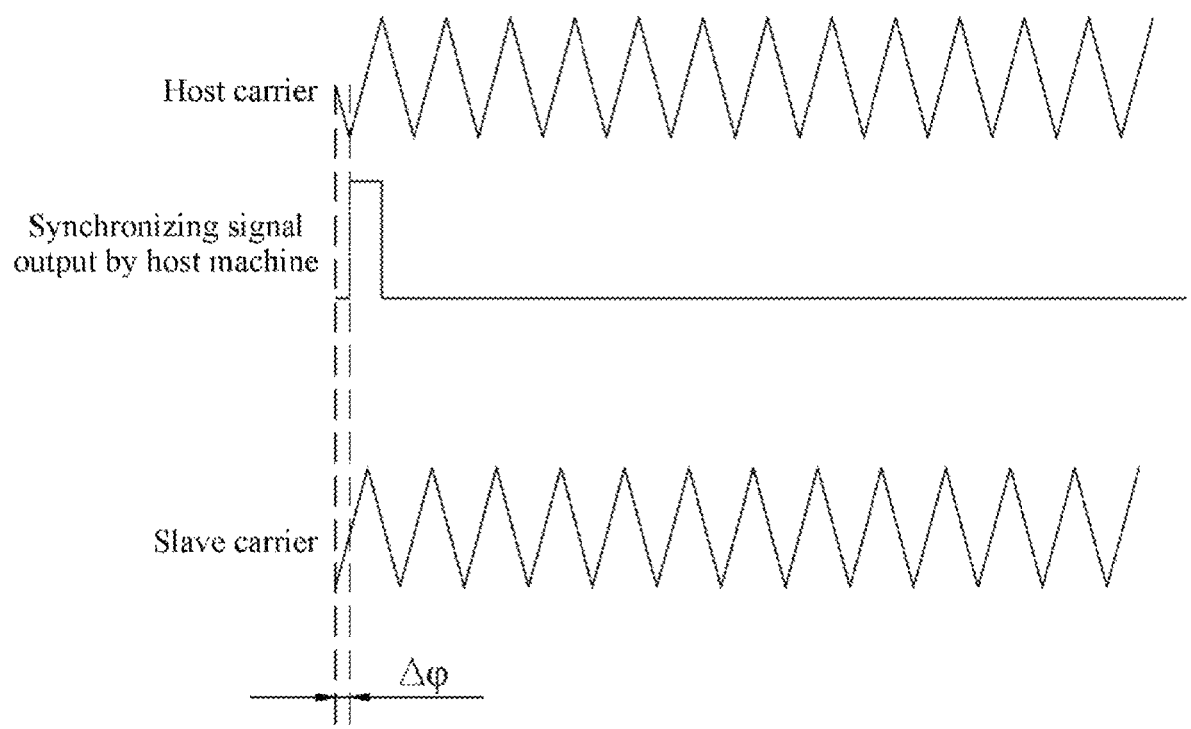
FIG. 3 is a schematic diagram of carrier correction in the second embodiment of the present disclosure.

In the embodiment, as shown in FIG. 1 and FIG. 2, the specific structure of the photovoltaic system is the prior art. The photovoltaic system mainly includes a plurality of photovoltaic panel groups 110, a plurality of converters 120 and a plurality of inverters 130. The photovoltaic panel groups 110 and the converters 120 are correspondingly connected to access a DC (Direct Current) bus. The converters 120 are connected in parallel with one another to form a converter group. At the same time, the inverters 130 are connected in parallel with one another to form an inverter group. An input end of the inverter group is connected with the DC bus, and an output end of the inverter group is connected with the power grid to form a string photovoltaic system.

It is understandable that as shown in FIG. 1 and FIG. 2, the converter 120 includes, but is not limited to, a three-level topology. In addition, in order to improve the structural reliability of the photovoltaic system, the inverter 130 is of a parallel structure, and the inverter 130 includes, but is not limited to, a three-level topology.

In step S100, synchronization of carriers is very important. The synchronization of carriers is related to whether the inverters 130 can operate in accordance with the switching states controlled by the modulation result. In order to ensure that the carriers inputted to each inverter 130 remain synchronized, in one embodiment of the present disclosure, as shown in FIG. 1 and FIG. 2, in the photovoltaic system, a control module is provided to ensure that the carriers transmitted to the inverters 130 can remain synchronized.

In the embodiment, the structure and operation mode of the control module are various, including but not limited to the following two types.

In the first structure, as shown in FIG. 1, the control module includes a controller 200. The controller 200 is electrically connected with each inverter 130, so that the controller 200 simultaneously transmits triangular carriers to each inverter 130, and then carrier synchronization of the inverters 130 is realized.

In the second structure, as shown in FIG. 2 the control module includes a plurality of controllers 200. Each controller 200 can be electrically connected to a corresponding inverter 130. The carriers are simultaneously transmitted to each controller 200 and then transmitted through the controller 200 to a corresponding inverter 130.

It is understandable that, for the first structure, quick response for the carriers can be realized through one controller 200, and the overall cost of the control module is relatively low. However, when the controller 200 breaks down, all inverters 130 cannot input the carriers, and then the leakage current of the photovoltaic system cannot be suppressed. For the second structure, the controllers 200 are connected to the corresponding inverters 130. Although the overall cost of the control module is increased, the inverters 130 connected to the controllers 200 that have not broken down can normally perform synchronous input operation of carriers when some of the controllers 200 break down. Although the potential variation of the common-mode components output by the photovoltaic system may be slightly increased, a good leakage current suppression effect can still be achieved. The first structure or the second structure can be selected by those skilled in the art according to actual requirements.

Figure 12:
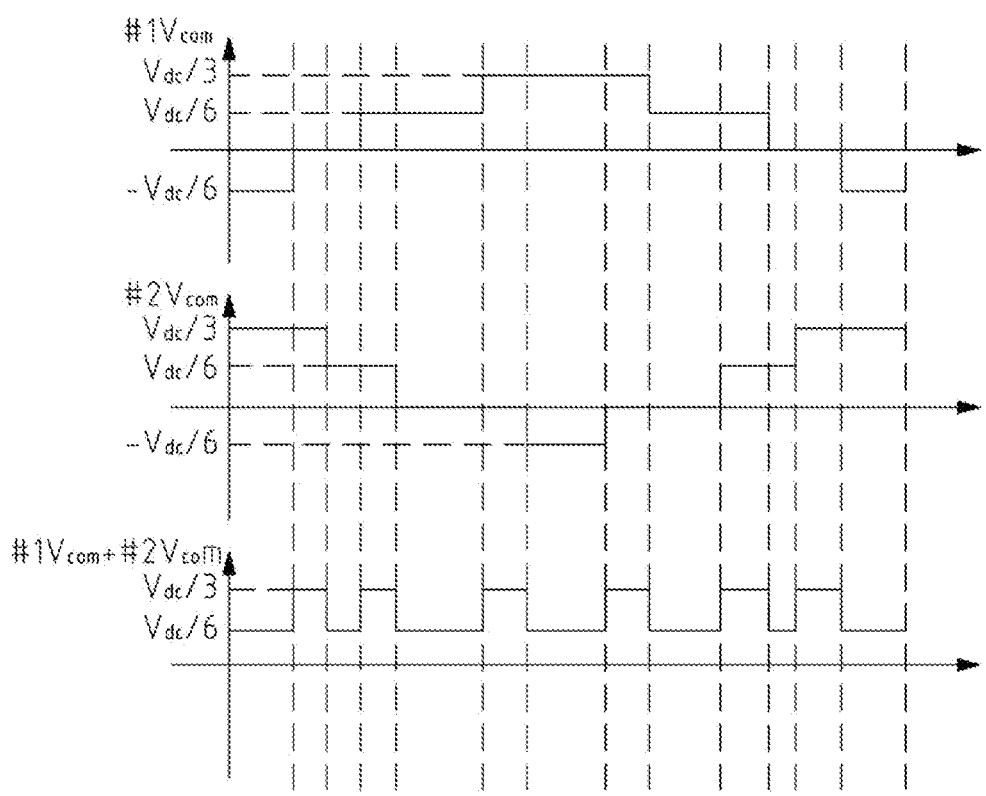
FIG. 12 is a superimposed schematic diagram of common-mode components of FIG. 10 and FIG. 11 in the present disclosure.

In the embodiment, as shown in FIG. 12, for the second structure, since there is a slight deviation in the response time of each controller 200, the carriers of each inverter 130 may be asynchronous after the inverter 130 has operates for a certain period of time. Therefore, generally, the photovoltaic system needs carrier correction after the inverters 130 operate for N switching periods, and the specific correction process includes the following steps:

S110, selecting any one of the inverters 130 as a host machine and the rest of the inverters 130 as slave machines;

S120, after every N switching periods, transmitting a synchronizing signal to the rest of the controllers 200 by the controller 200 connected with the host machine;

S130, after the synchronizing signal is received, comparing the phase difference between the zero point of the received triangular carriers and the synchronizing signal by the controller 200 connected with the slave machines; and S140, carrying out closed-loop regulation according to the phase difference by the controller 200 connected with the slave machines so as to synchronize the carriers of the host machine and the slave machines.

It is understandable that in step S140, various types of closed-loop regulation for phase difference can be realized through carrier hysteresis. That is, the phase difference Δφ between the zero point of the triangular carriers and the synchronizing signal is obtained in step S130, and then the Δφ-phase hysteresis is carried out on carriers of slave machines to ensure that the carriers of the slave machines and the master machine remain synchronized.

Meanwhile, the response time of the controller 200 is generally in millisecond grade. Therefore, the number of switching periods required for the host machine and the slave machines to produce a large phase difference is large, and the value of N can generally be 2000.

In one embodiment of the present disclosure, in step S200, various types of carrier modulation are provided. The carrier modulation is preferably space vector modulation, and the specific modulation process includes the following steps:

S210, numbering the inverters 130 #1, . . . , #n in sequence, wherein the value of n is greater than or equal to 2;

S220, carrying out space vectorization on the output voltage of the inverter 130 to obtain a synthesized vector of the output voltage of any inverter 130 and corresponding vector action time;

S230, allocating a starting small vector of the inverter #1, and taking a corresponding redundant small vector as a starting small vector of the next inverter 130 until the redundant small vector corresponding to the inverter #n−1 is the starting small vector of the inverter #n; and S240, respectively forming the switching state action sequence of each inverter 130 according to the allocated starting small vector.

Figure 4:
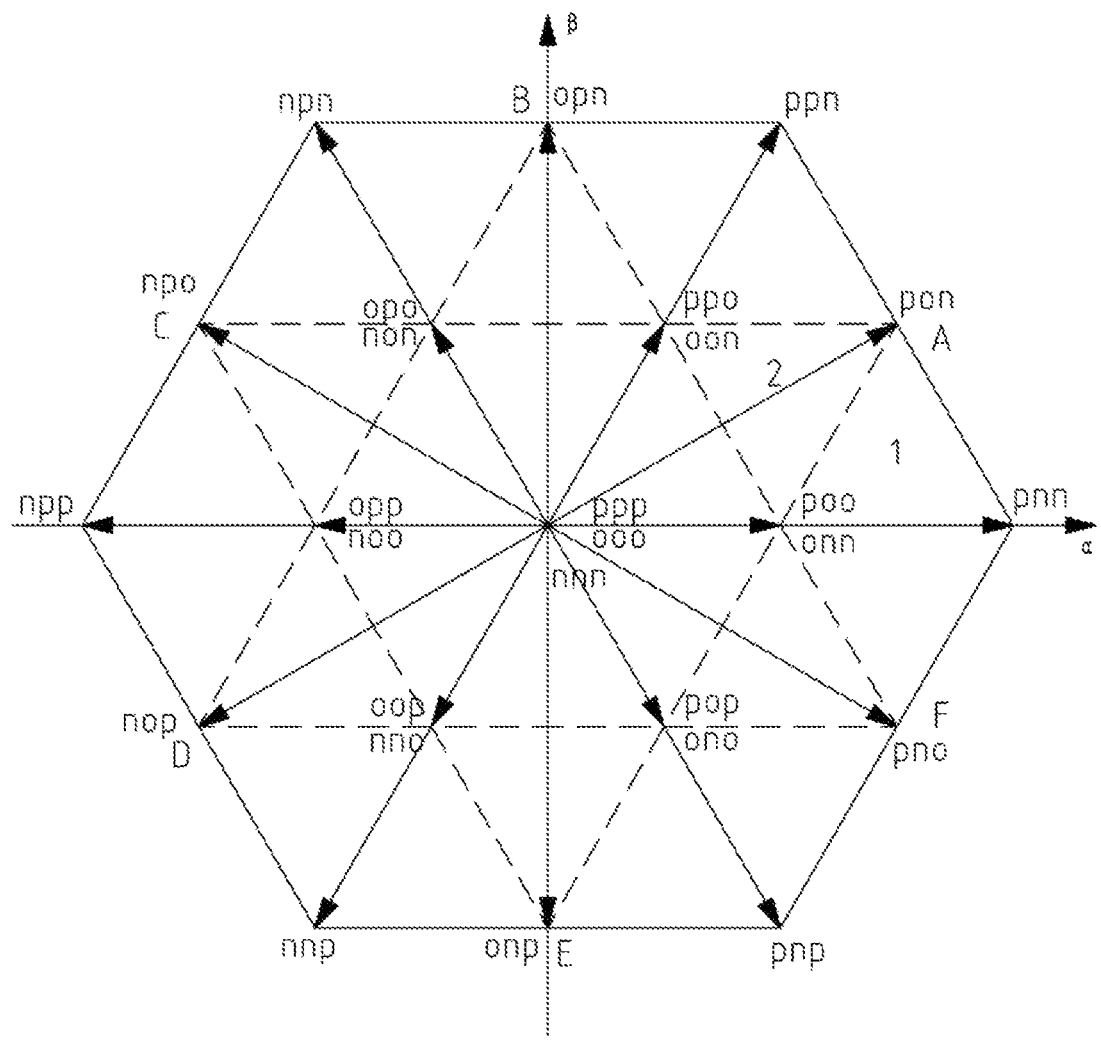
FIG. 4 is a structural schematic diagram of a space vector diagram in the present disclosure.

In the embodiment, since the inverter 130 is a three-level inverter for output, when space vectorization of the output voltage of the inverter 130 is carried out, a three-level space vector diagram having six sectors as shown in FIG. 4 can be obtained.

In the embodiment, in step S220, the action time of the vector is calculated by judging that the resultant vector is located in the region of a space vector diagram.

Specifically, as shown in FIG. 4, each sector of the space vector diagram is divided into four regions. The resultant vector of the output voltage of the inverter 130 can fall into any region of any sector. In addition, the four regions of each sector of the space vector diagram are triangular, so that the inverter 130 can adopt a seven-stage principle of space vector modulation when carrying out space vector modulation in step S230.

It is understandable that the seven-stage principle of space vector modulation is well known to those skilled in the art. That is to say, the principle starts from a small vector to a corresponding redundant small vector, and then the starting small vector is returned.

For convenience of understanding, the specific modulation process can be described by only including inverter #1 and inverter #2 in the photovoltaic system.

As shown in FIG. 4, the endpoints of each region of the space vector graph are marked. Assuming that POO and ONN are redundant small vectors of the same vector according to the seven-stage principle of space vector modulation when the resultant vectors of the output voltages of inverter #1 and inverter #2 both fall into region 1 of sector A, inverter #1 and inverter #2 respectively use two redundant small vectors as starting points for vector sequencing.

If inverter #1 starts with ONN, inverter #2 starts with the corresponding vector POO.

Figure 5:
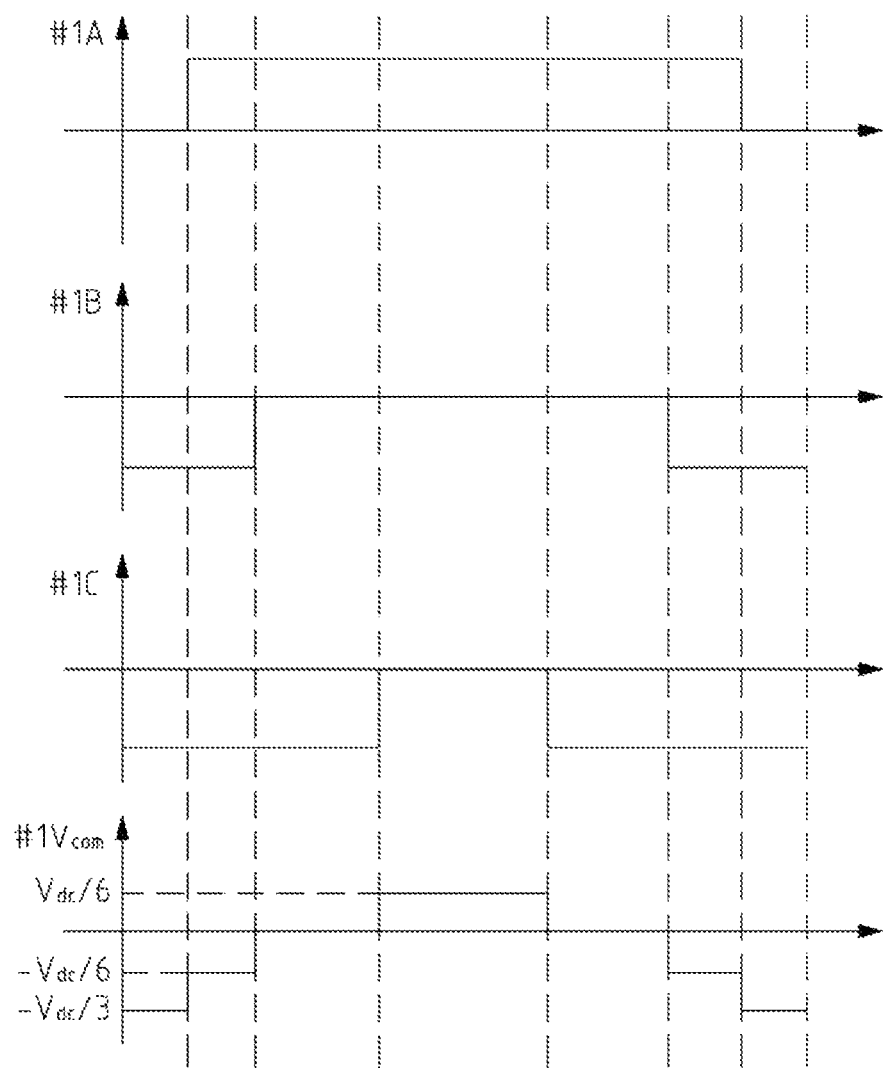
FIG. 5 is a switching state time sequence schematic diagram when inverter #1 falls into region 1 of sector A in the present disclosure.
Figure 6:
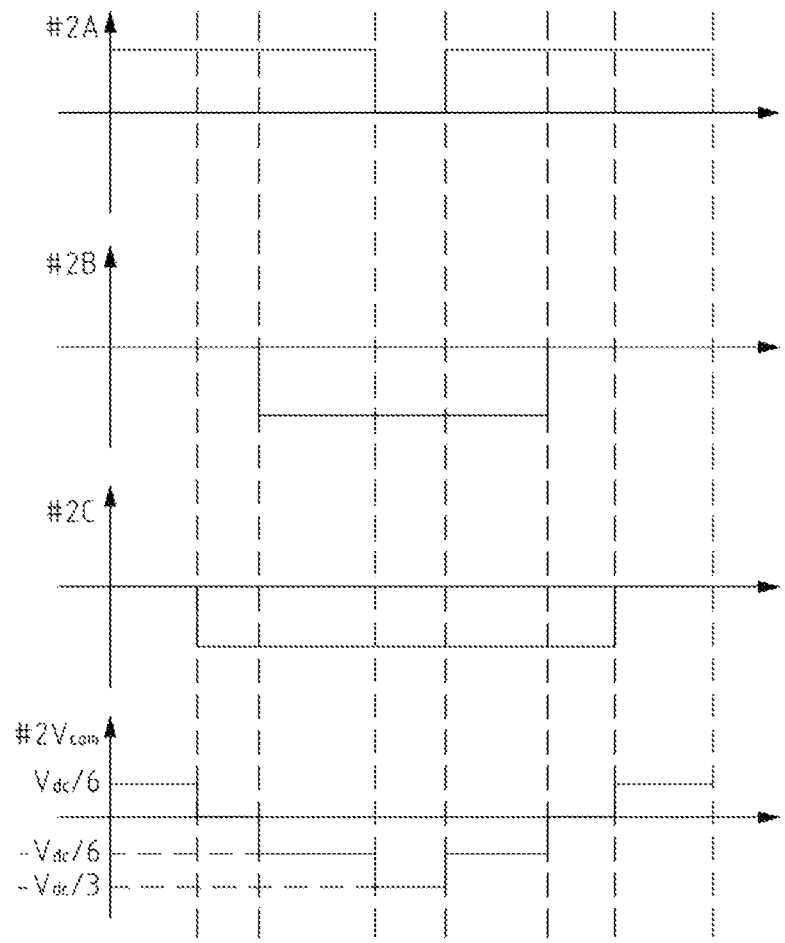
FIG. 6 is a switching state time sequence schematic diagram when inverter #2 falls into region 1 of sector A in the present disclosure.
Figure 7:
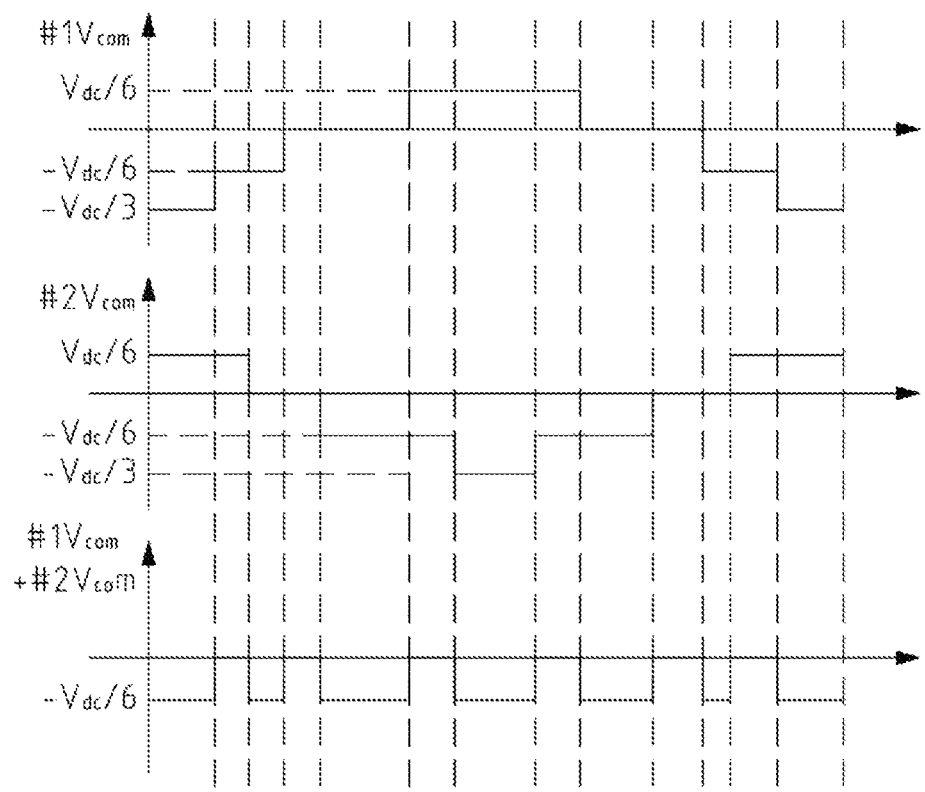
FIG. 7 is a superimposed schematic diagram of common-mode components of FIG. 5 and FIG. 6 in the present disclosure.

Therefore, the switching action sequence of inverter #1 is ONN, PNN, PON, POO, PON, PNN and ONN. Through the aforementioned switching action sequence, inverter #1 can obtain a switching state time sequence schematic diagram as shown in FIG. 5. The switching action sequence of inverter #2 is POO, PON, PNN, ONN, PNN, PON and POO. Through the aforementioned switching action sequence, inverter #2 can obtain a switching state time sequence schematic diagram as shown in FIG. 6. Therefore, by superimposing the switching state time sequence diagrams of FIG. 5 and FIG. 6, a superimposed schematic diagram of common-mode components as shown in FIG. 7 can be obtained.

At this time, the common-mode component of the photovoltaic system is the superposition of the common-mode component of inverter #1 and the common-mode component of inverter #2. As shown in FIG. 7, the two common-mode components of inverter #1 and inverter #2 are staggered, so that the two common-mode components can be partially canceled out when superimposed, and then the common-mode component of the superimposed photovoltaic system changes only between $-Vdc/6$ and 0.

Figure 8:
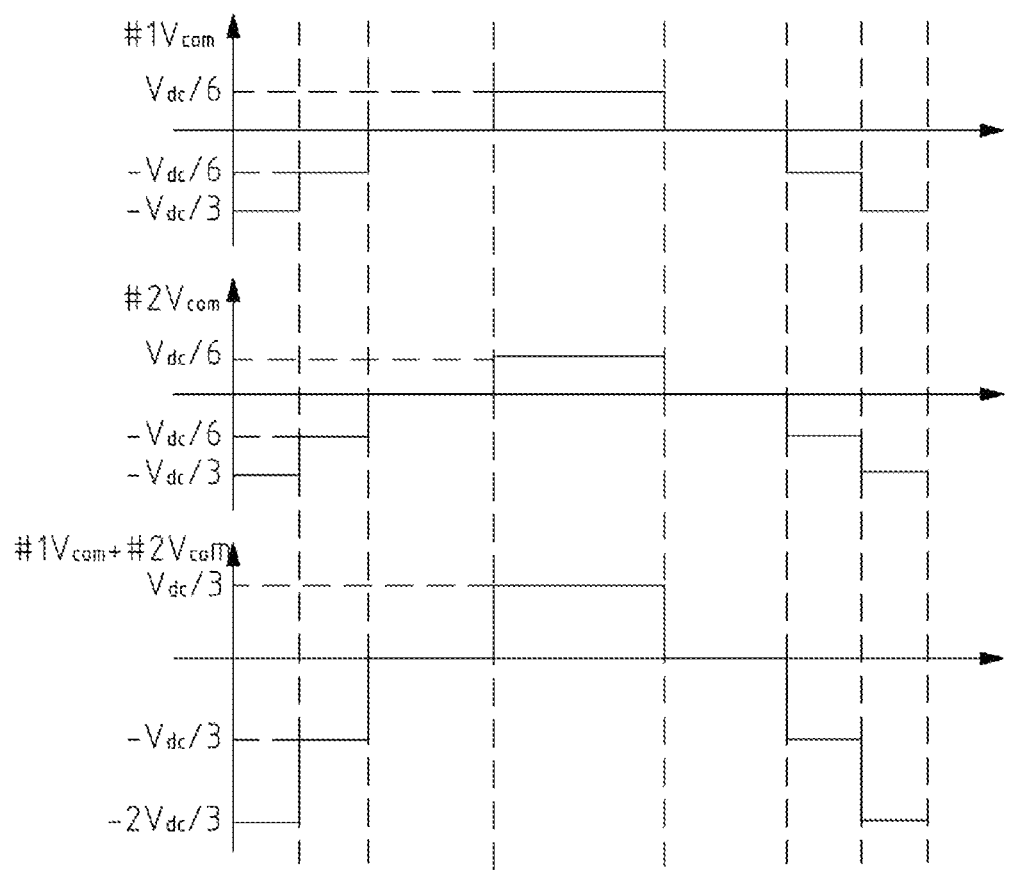
FIG. 8 is a first superimposed schematic diagram of common-mode components when inverter #1 and inverter #2 simultaneously fall into region 1 of sector A in the prior art.
Figure 9:
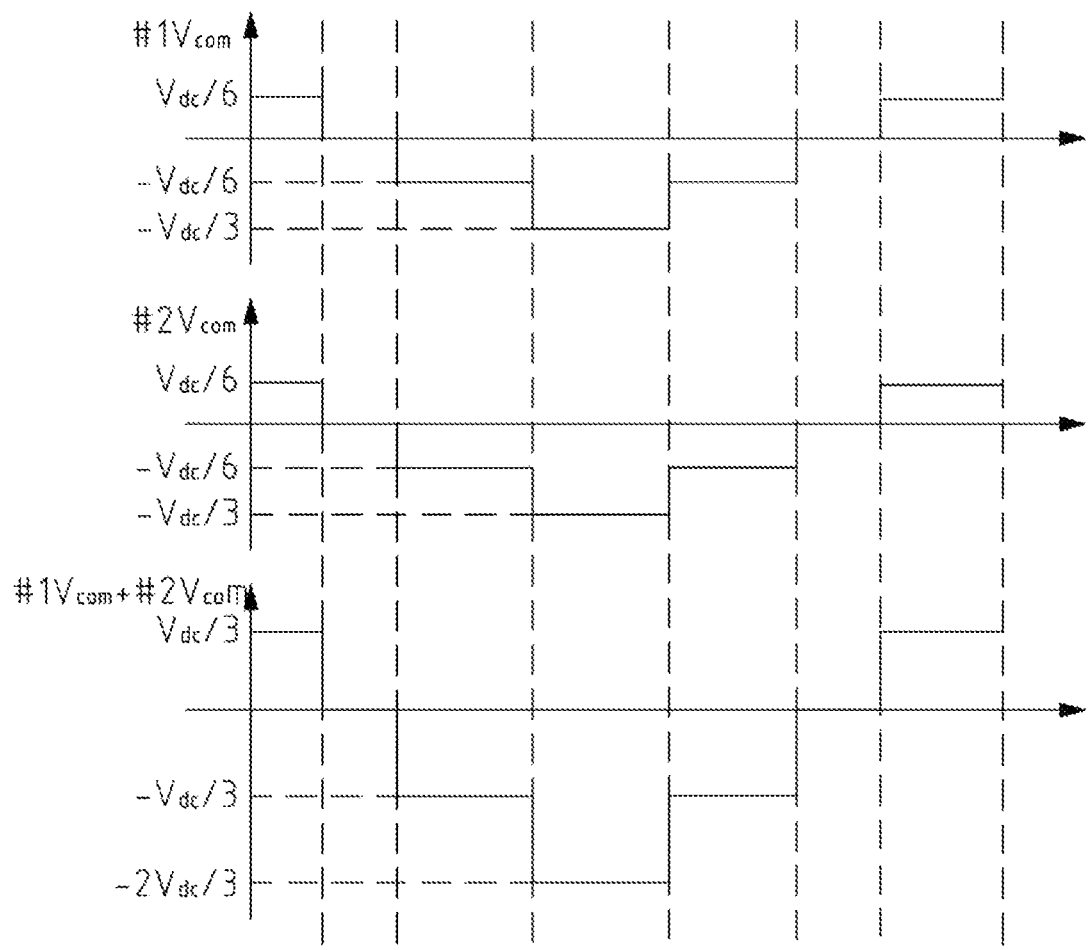
FIG. 9 is a second superimposed schematic diagram of common-mode components when inverter #1 and inverter #2 simultaneously fall into region 1 of sector A in the prior art.

During vector modulation of inverter #1 and inverter #2 with a traditional method, if inverter #1 and inverter #2 fall into region 1 of sector A at the same time, both inverters use the switching sequence of ONN, PNN, PON, POO, PON, PNN and ONN to obtain the superposed schematic diagram of common-mode components as shown in FIG. 8. Or, the switching sequence of POO, PON, PNN, ONN, PNN, PON and POO is used to obtain the superposed schematic diagram of common-mode components as shown in FIG. 9. Regardless of FIG. 8 or FIG. 9, it can be seen that the common-mode component of the photovoltaic system varies between $Vdc/3$ and $-2Vdc/3$.

In summary, the potential variation $\Delta U1=|-Vdc/6-0|=Vdc/6$ of the common-mode component of the photovoltaic system obtained by the space vector modulation method in the present disclosure can be obtained. And the potential variation $\Delta U2=|Vdc/3-(-2Vdc/3)|=Vdc$ of the common-mode component of the photovoltaic system obtained by a traditional modulation method can be obtained. That is, the potential variation of the common-mode component of the photovoltaic system obtained by the modulation method in the present disclosure is one sixth of the potential variation of the common-mode component of the photovoltaic system obtained by the traditional modulation method. Therefore, the potential variation of the common-mode component of the photovoltaic system can be greatly reduced through the modulation method in the present disclosure, and then a good suppression effect on the leakage current generated by the photovoltaic system is achieved.

Then, assuming that OON and PPO are redundant small vectors of the same vector according to the seven-stage principle of space vector modulation when the resultant vectors of the output voltages of inverter #1 and inverter #2 both fall into region 2 of sector A, inverter #1 and inverter #2 respectively use two redundant small vectors as starting points for vector sequencing.

If inverter #1 starts with OON, inverter #2 starts with the corresponding vector PPO.

Figure 10:
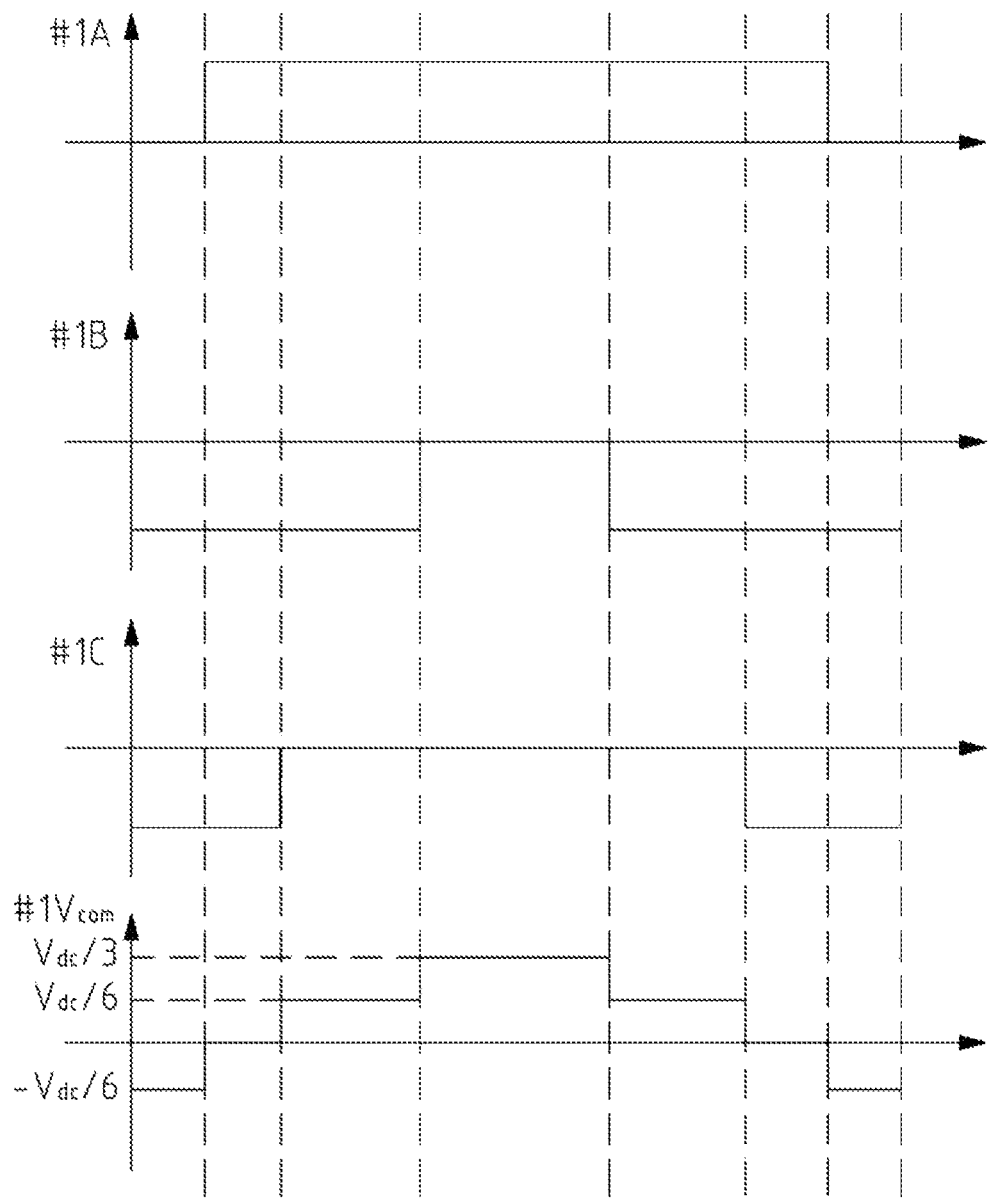
FIG. 10 is a switching state time sequence schematic diagram when inverter #1 falls into region 2 of sector A in the present disclosure.
Figure 11:
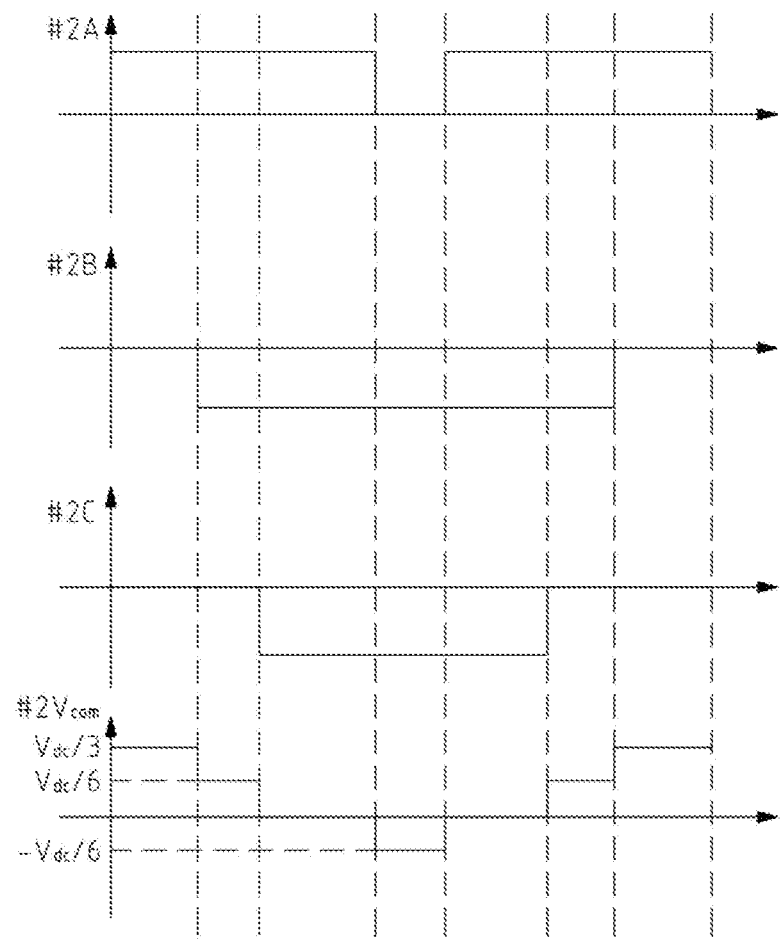
FIG. 11 is a switching state time sequence schematic diagram when inverter #2 falls into region 2 of sector A in the present disclosure.

Therefore, the switching action sequence of inverter #1 is ONN, PNN, PON, POO, PON, PNN and ONN. Through the aforementioned switching action sequence, inverter #1 can obtain a switching state time sequence schematic diagram as shown in FIG. 10. The switching action sequence of inverter #2 is POO, PON, PNN, ONN, PNN, PON and POO. Through the aforementioned switching action sequence, inverter #2 can obtain a switching state time sequence schematic diagram as shown in FIG. 11. Therefore, by superimposing the switching state time sequence diagrams of FIG. 10 and FIG. 11, a superimposed schematic diagram of common-mode components as shown in FIG. 12 can be obtained.

At this time, the common-mode component of the photovoltaic system is the superposition of the common-mode component of inverter #1 and the common-mode component of inverter #2. As shown in FIG. 12, the two common-mode components of inverter #1 and inverter #2 are staggered, so that the two common-mode components can be partially canceled out when superimposed, and then the common-mode component of the superimposed photovoltaic system changes only between $Vdc/6$ and $Vdc/3$.

Figure 13:
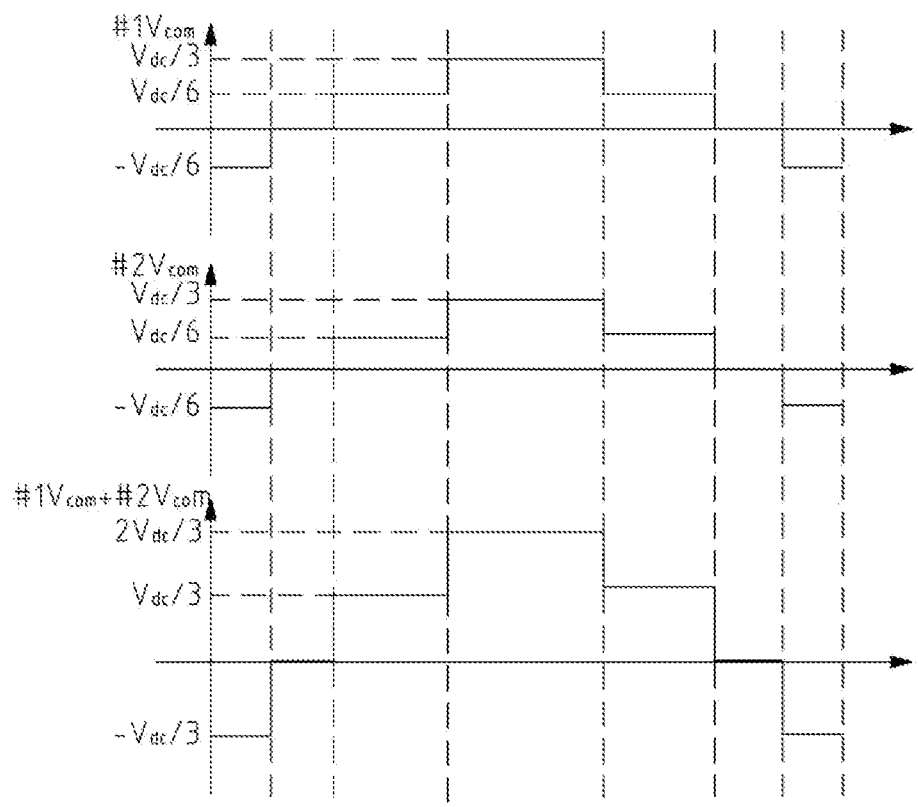
FIG. 13 is a first superimposed schematic diagram of common-mode components when inverter #1 and inverter #2 simultaneously fall into region 2 of sector A in the prior art.
Figure 14:
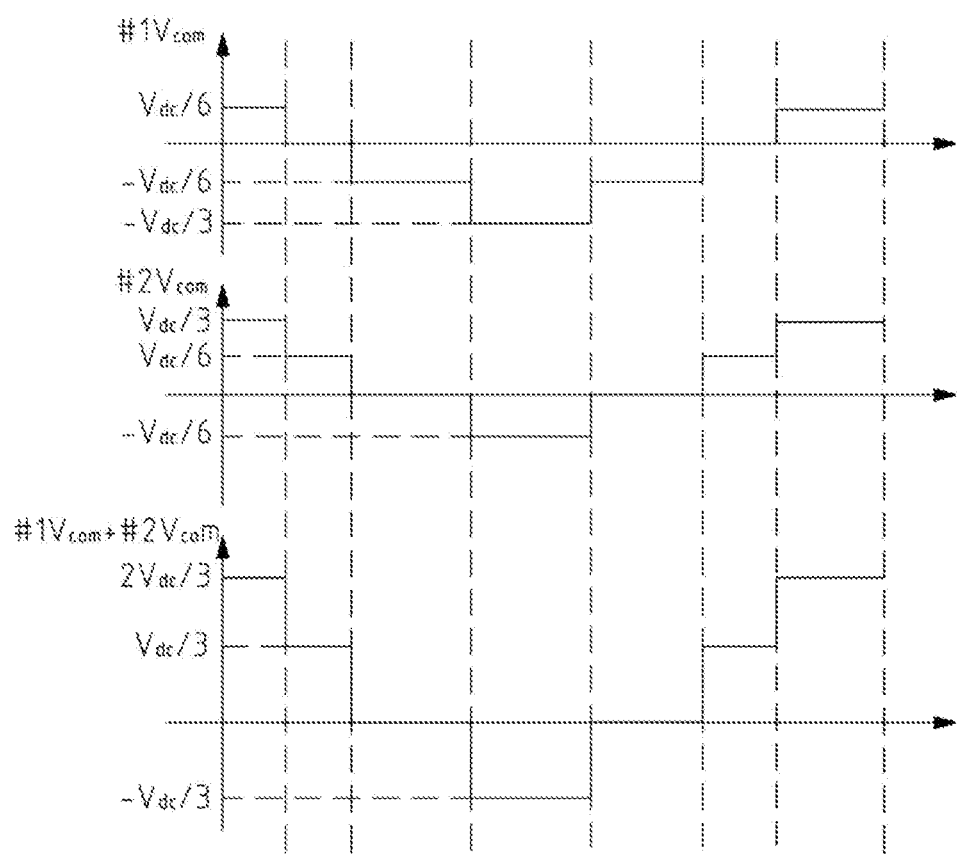
FIG. 14 is a second superimposed schematic diagram of common-mode components when inverter #1 and inverter #2 simultaneously fall into region 2 of sector A in the prior art.

During vector modulation of inverter #1 and inverter #2 with a traditional method, if inverter #1 and inverter #2 fall into region 2 of sector A at the same time, both inverters use the switching sequence of OON, PON, POO, PPO, POO, PON and OON to obtain the superposed schematic diagram of common-mode components as shown in FIG. 13. Or, the switching sequence of PPO, POO, PON, OON, PON, POO and PPO is used to obtain the superposed schematic diagram of common-mode components as shown in FIG. 14. Regardless of FIG. 13 or FIG. 14, it can be seen that the common-mode component of the photovoltaic system varies between $-Vdc/3$ and $2Vdc/3$.

In summary, the potential variation $\Delta U1=|Vdc/6-Vdc/3|=Vdc/6$ of the common-mode component of the photovoltaic system obtained by the space vector modulation method in the present disclosure can be obtained. And the potential variation $\Delta U2=|-Vdc/3-2Vdc/3|=Vdc$ of the common-mode component of the photovoltaic system obtained by a traditional modulation method can be obtained. That is, the potential variation of the common-mode component of the photovoltaic system obtained by the modulation method in the present disclosure is one sixth of the potential variation of the common-mode component of the photovoltaic system obtained by the traditional modulation method. Therefore, the potential variation of the common-mode component of the photovoltaic system can be greatly reduced through the modulation method in the present disclosure, and then a good suppression effect on the leakage current generated by the photovoltaic system is achieved.

The basic principles, principal features and advantages of the present disclosure are shown and described above. Those skilled in the art should understand that the present disclosure is not limited by the above-described embodiments, the above-described embodiments and specification are merely illustrative of the principles of the present disclosure, various changes and modifications may occur to the present disclosure under the premise of without departing from the spirit and scope of the present disclosure, and these changes and modifications fall within the scope of the present disclosure as claimed. The scope of the present disclosure is defined by the appended claims and equivalents thereof.

What is claimed is:

1. A leakage current suppression method for a string photovoltaic system, comprising the following steps:
    S100, inputting synchronous carriers to a plurality of parallel inverters included in the photovoltaic system;
    S200, carrying out carrier modulation on the inverters;
    S300, controlling the switching states of the inverters according to the result of carrier modulation, and then dislocating common-mode components output by the inverters, so that part of the common-mode components of the inverters are canceled out, and the potential variation of the common-mode components output by the photovoltaic system is reduced;
    in step S200, the carrier modulation is space vector modulation, and the specific modulation process comprises the following steps:
    S210, numbering the inverters #1, . . . , #n in sequence;
    S220, carrying out space vectorization on the output voltage of the inverter to obtain a synthesized vector of the output voltage of any inverter and corresponding vector action time;

S230, allocating a starting small vector of the inverter #1, and taking a corresponding redundant small vector as a starting small vector of the next inverter until the redundant small vector corresponding to the inverter #n-1 is the starting small vector of the inverter #n; and S240, respectively forming the switching state action sequence of each inverter according to the allocated starting small vector.

2. The leakage current suppression method for a string photovoltaic system according to claim 1, wherein in step S220, the action time of the vector is calculated by judging that the resultant vector is located in the region of a space vector diagram.

3. The leakage current suppression method for a string photovoltaic system according to claim 2, wherein the space vector diagram comprises six uniformly distributed sectors, and each sector is divided into four regions; and the resultant vector is suitable when the resultant vector falls into any area of any sector.

4. He leakage current suppression method for a string photovoltaic system according to claim 3, wherein the four regions of the sector are all triangular; and a seven-stage principle of space vector modulation is adopted in step S230.

5. The leakage current suppression method for a string photovoltaic system according to claim 4, wherein in step S100, the carriers transmitted to the inverters are used for synchronization through a control module.

6. The leakage current suppression method for a string photovoltaic system according to claim 2, wherein in step S100, the carriers transmitted to the inverters are used for synchronization through a control module.

7. The leakage current suppression method for a string photovoltaic system according to claim 3, wherein in step S100, the carriers transmitted to the inverters are used for synchronization through a control module.

8. The leakage current suppression method for a string photovoltaic system according to claim 1, wherein in step S100, the carriers transmitted to the inverters are used for synchronization through a control module.

9. The leakage current suppression method for a string photovoltaic system according to claim 5, wherein the control module comprises a controller, and the controller is electrically connected with the inverters, so that triangular carriers are transmitted to the inverters through the controller.

10. The leakage current suppression method for a string photovoltaic system according to claim 8, wherein the control module comprises a plurality of controllers, and the controllers are electrically connected with the corresponding inverters; and the carriers are synchronously transmitted to the controllers and then transmitted to the corresponding inverters through the controllers.

11. The leakage current suppression method for a string photovoltaic system according to claim 10, wherein the photovoltaic system needs carrier correction after the inverters operate for N switching periods, and the specific correction process comprises the following steps:

S110, selecting any one of the inverters as a host machine and the rest of the inverters as slave machines;

S120, after every N switching periods, transmitting a synchronizing signal to the rest of the controllers by the controller connected with the host machine;

S130, after the synchronizing signal is received, comparing the phase difference between the zero point of the triangular carriers and the synchronizing signal by the controller connected with the slave machines; and S140, carrying out closed-loop regulation according to the phase difference by the controller connected with the slave machines so as to synchronize the carriers of the host machine and the slave machines.

12. The leakage current suppression method for a string photovoltaic system according to claim 11, wherein in step S120, the value of N is 2000.

* * * * *